Feb. 8, 1949. J. W. MOCKABEE 2,460,840
HANDLE LOCK FOR HINGED HANDLE UTENSILS
Filed Sept. 26, 1944
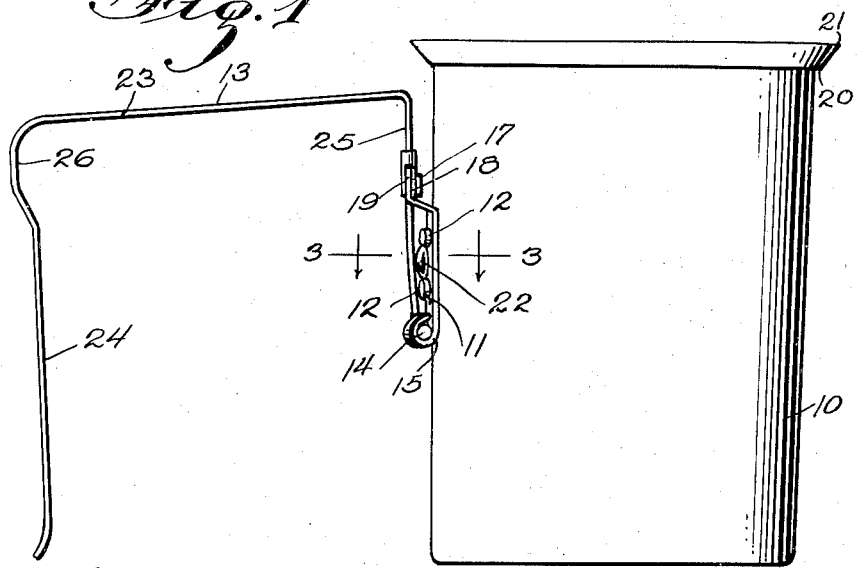
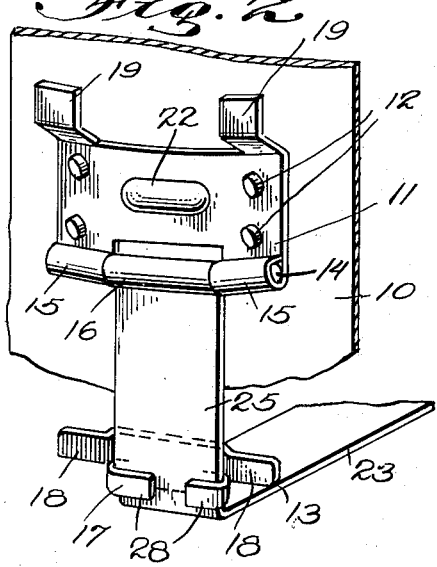
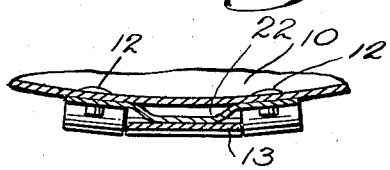
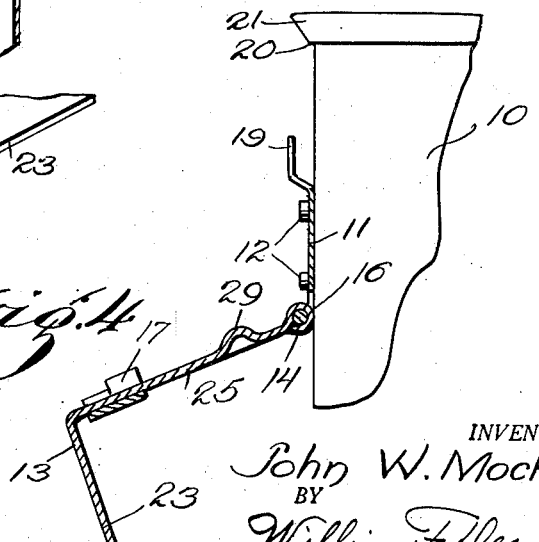
INVENTOR.
John W. Mockabee
BY
William F. Desmond
ATTORNEY Patented Feb. 8, 1949

2,460,840

UNITED STATES PATENT OFFICE 2,460,840

HANDLE LOCK FOR HINGED HANDLE UTENSILS

John W. Mockabee, United States Army, Washington, D. C.

Application September 26, 1944, Serial No. 555,865

6 Claims. (Cl. 16—110)

(Granted under the act of March 3, 1883, as amended April 30, 1928; 370 O. G. 757)

The invention described herein, if patented may be manufactured and used by or for the Government for governmental purposes, without the payment to me of any royalty thereon.

My invention relates to a hinged handle for a canteen cup or other utensil and, more particularly, to a tension locking means for locking the handle in operative position to prevent accidental disengagement of the handle lock when the cup is being used.

The canteen cups now in universal use in the armed forces have a hinged handle which may be locked in operative position by a sliding lock engaging behind two lugs on the handle attaching member. When not in use, the handle is turned under and nests along the sides and bottom of the cup, and it is held in this position by the tension of the free end of the handle against the wall of the cup. These cups have proved very satisfactory except for the fact that the sliding lock, which holds the handle in operative position, only loosely engages the lugs on the handle attaching member and has a tendency to slip partly out of engagement when the cup is empty and is jostled about as the men pass through the "chow line" to the dispensing table and, particularly, when the cup is dipped in the scalding bucket. This is not easily observed by the men because the lock will continue to hold the handle in operative position while the cup is empty, but when it is being filled, or almost immediately thereafter, the weight of the contents causes the handle lock to slip and the cup turns over, spilling the contents on its holder and, very likely, on others in the immediate vicinity, and possibly wetting other food on the dispensing table. My new handle locking means positively secures the handle lock in locking position and insures against accidental disengagement, yet permits easy disengagement when that is desired. As the description proceeds, it will be obvious that my invention is not limited in its application to a canteen cup, but may be applied to all types of utensils having hinged handles.

It is an object of the invention to provide a canteen cup or other utensil having a hinged handle, a lock for securing the handle in operative position, and means for preventing the lock from accidentally becoming disengaged when the handle is in operative position, whether the cup is full or empty.

Another object of the invention is the provision of a hinged handle, handle lock, and handle attaching member for a canteen cup or other utensil which is provided with fulcrum means for producing outwardly directed tension in the handle when the latter is in operative position which acts on the lock to prevent its accidental disengagement.

Another object of the invention is the provision of a hinged handle for a canteen cup or other utensil which is locked from accidental disengagement by tension in the handle between the hinged end of the handle and the lock which holds the handle in operative position.

Another object of the invention is the provision in a canteen cup or other utensil having a hinged handle and a sliding lock for locking the handle in position, of means for producing outwardly directed tension in the handle to force the handle lock into positive engagement and which can readily be disengaged when so desired by the application of inwardly directed force on the handle.

Another object of the invention is the provision in a canteen cup, or other utensil, having a hinged handle and a sliding lock for locking the handle in position, of a positive means for preventing accidental disengagement of the lock which may readily be incorporated in the utensil, as presently manufactured, without changing the design thereof.

These and other objects of the invention will become apparent from the following description and accompanying drawings in which:

Figure 1 is a side elevational view of a canteen cup with the handle in operative position.

Figure 2 is a partial perspective view of a handle attaching member, handle, and handle lock.

Figure 3 is a sectional view taken on the line 3—3 of Figure 1.

Figure 4 is a partial side elevation of a canteen cup showing a modified form of my invention.

Referring to the drawings, the canteen cup comprises a cup or body 10 of aluminum or stainless steel, a handle attaching member 11 secured to the cup 10 by rivets 12, or other suitable means, a handle 13 pivoted at one end to the attaching member 11 on a hinge pin 14 received in the rolled bifurcated ends 15 of the attaching member and a rolled end 16 of the handle 13. A lock 17 slidably secured on the handle 13, and having laterally extending wings 18 which engage behind lugs 19 on the attaching member 11, holds the handle in operative position.

Cups of this type are ordinarily carried over the hip in a carrier attached to a cartridge or pistol belt, so the body of the cup 10 is of arcuate shape to conform to the hips. The lip of the cup is flared outwardly as shown at 20 and is provided with a beaded edge 21.

The handle hinge attaching member 11 is formed from a flat steel plate and is provided with a pair of spaced upwardly extending lugs 19, offset outwardly from the body of the attaching member. The lower edge of the handle attaching member is bifurcated and these bifurcated ends are rolled, as indicated at 15, to provide a journal for reception of the hinge pin 14. A horizontally extending centrally located embossed projection 22 is provided in the attaching member 11 in the line of travel of the handle for a purpose to be hereinafter described, and the completed member is secured to the back wall of the cup by rivets 12, or other suitable means.

Handle 13 is formed from any suitable metallic bar or sheet material, preferably corrosion resisting steel, and has horizontal and vertical gripping portions 23 and 24, respectively, and a hinge arm 25 depending from the end of the horizontal gripping portion 23. The horizontal and vertical gripping portions of the handle are joined by a small open loop 26 for increasing the resilience of the gripping arm 23. The end of the hinge arm 25 is rolled as at 16, to freely receive the hinge pin 14 used in securing the handle to the attaching member 11.

In assembled relation, the rolled end 16 is received between the rolled bifurcated ends 15 of the attaching member 11, and after the pin 14 is inserted, the rolled ends 15 of the attaching member are tightened on the pin 14 to hold the latter in place. This mounting permits the handle to swing freely on the hinge pin 14 so that it may be raised to operative position, as shown in Figure 1, or swung around to inoperative position with the hinge arm 25 and the vertical and horizontal gripping portions 24 and 23 nesting along the side walls and bottom of the cup. The handle is held in the latter position by the resilient action of the loop 26 pressing the vertical arm 24 against the front wall of the cup 10. After the handle is formed, it may be heat treated to give it the proper resilience and, if desired, it may be plated with corrosion and rust-resisting material.

The sliding lock 17 is formed from a flat steel plate split longitudinally at each end for a portion of its length. Opposed end portions are turned back upon the body of the lock, spaced therefrom to form clips 28 for embracing the edges of the handle to slidably secure the lock on the hinge arm 25 of the handle. The remaining end portions are offset inwardly to form wings 18 which extend outwardly from each end of the lock and are received behind the lugs 19 on the handle attaching member to hold the handle in operative position. When it is desired to swing the handle out of operative position, the sliding lock 17 is moved upwardly until the wings 18 disengage from the lugs 19. The handle may then be swung to inoperative position.

In the canteen cups, as presently manufactured, the handle is held in raised position by the sliding lock 17 which loosely fits behind the lugs 19. As long as the cup is held in upright position, the lock will remain in position even though the cup is empty, but in such a case, if it is jostled about, or is allowed to swing freely as it is carried in the hand, or when it is dipped into the scalding bucket, preparatory to going through the "chow line," the sliding lock may slide partly out of engagement with the lugs 19, and when liquid is poured into the cup the weight of it causes the lock to disengage and the cup tips, wasting the liquid and usually wetting the holder of the cup and others in the immediate vicinity and, possibly, wetting other food.

In my new and improved cup the sliding lock 17 is positively held against accidental disengagement by outwardly directed tension in the hinge arm 25 of the handle. The raised projection 22 is elevated sufficiently above the normal plane of the hinge arm 25 to cause the hinge arm to engage the projection 22 midway between its pivoted end and the place at which the lock 17 rests on the hinge arm when the lock is in locking position. Thus, the projection acts as a fulcrum, tending to keep the upper end of the arm 25 spaced from the sides of the cup so that it must be forced inwardly by pushing inwardly on the end of the horizontal gripping portion 23 of the handle to bring it into a position where the sliding lock 17 can be made to engage behind the lugs 19. When the handle is then released, the outwardly directed tension in the hinge arm causes the lock to be forcibly held in engagement with the lugs 19, and accidental slipping of the lock is prevented in any position in which the cup may be held even though it is empty. The lock 17 may be disengaged by pushing inwardly on the horizontal portion 23 of the handle with a force sufficient to overcome the tension in the arm 25 and then moving the lock up on the arm out of the path of the lugs 19.

In Figure 4, I have illustrated a modification of the invention in which I have provided an embossed projection 29 in the hinge arm 25 of the handle, instead of the attaching member 11. The operation of this modification is similar to the operation of the preferred embodiment of the invention.

It will be obvious that other modifications may be made to provide a projection on which the handle can be fulcrumed. Such a projection may even be obtained by locating certain of the rivets 12 by which the attaching member is secured to the cup in such a position that one or more of them form a projection on which the arm 25 will fulcrum.

Having thus described my invention, what I claim as new and desire to secure by Letters Patent is as follows:

1. In a canteen cup or other utensil having a handle, and a hinge for pivotedly connecting said handle to said utensil, means for locking the handle in cup supporting position comprising a fixed locking element and slideable locking element engageable with said fixed element for disengageably supporting said handle in cup supporting position, and means spaced from said fixed locking element and located in the line of travel of said handle, said last-named means acting on said handle and opposed by said elements for frictionally locking said slideable element in handle supporting position.

2. In a canteen cup or other utensil having a hinged handle, means for locking the handle in cup supporting position comprising a fixed locking element and a slide engageable with said fixed locking element for disengageably supporting said handle in cup supporting position, and means spaced from said fixed locking element for producing tension in said handle in a direction to be opposed by said slide when the latter is in handle supporting position for frictionally locking said slide in the said position.

3. In a canteen cup or other utensil having a hinged handle, means for locking the handle in cup supporting position comprising a fixed locking element, a slide engageable with said fixed locking element for disengageably supporting said handle in cup supporting position, and a projection spaced from said fixed locking element and positioned for engaging said handle when the latter is in cup supporting position, said projection producing a tension in said handle in a direction to be opposed by said slide when the latter is in handle supporting position for frictionally locking said slide in the said position.

4. In a canteen cup or other utensil having a hinged handle, means for locking the handle in cup supporting position comprising a fixed locking element, a slide engageable with said fixed locking element for disengageably supporting said handle in cup supporting position, and a projection spaced from said fixed locking element and positioned for engaging said handle when the latter is in cup supporting position, said projection producing an outwardly directed tension in said handle when the latter is in cup supporting position opposed by said slide for frictionally locking the latter in handle supporting position, said handle being adapted to be moved to position for disengaging said slide upon the application of an inwardly directed force thereon sufficient to overcome the outwardly directed tension therein.

5. In a canteen cup or other utensil having a hinged handle, means for locking the handle in cup supporting position comprising a fixed locking element, a slide engageable with said fixed locking element for disengageably supporting said handle in cup supporting position, and an embossment spaced from said fixed locking element and projecting outwardly from the plane of the walls of said cup adapted to be engaged by said handle when the latter is in cup supporting position for producing tension therein, said slide opposing the tension in said handle when the slide is in handle supporting position for frictionally locking the slide in the said position.

6. In a canteen cup or other utensil having a hinged handle, means for locking the handle in cup supporting position comprising a fixed locking element, a slide engageable with said fixed locking element for disengageably supporting said handle in cup supporting position, and a projection on said handle adapted to engage said cup at a point spaced from said fixed locking element when said handle is in cup supporting position for producing tension therein, said slide opposing the tension in said handle for frictionally locking the slide in handle supporting position.

JOHN W. MOCKABEE.

REFERENCES CITED

The following references are of record in the file of this patent:

UNITED STATES PATENTS

| Number | Name | Date |
| --- | --- | --- |
| 403,656 | Gerstle | May 21, 1889 |
| 571,851 | Wright | Nov. 24, 1896 |
| 643,492 | Fromholz | Feb. 13, 1900 |
| 883,652 | Lenschow et al. | Mar. 31, 1908 |
| 1,077,946 | Walk | Nov. 4, 1913 |
| 1,163,211 | Chandler | Dec. 7, 1915 |
| 1,333,494 | Kilminster | Mar. 9, 1920 |
| 2,059,098 | Goodrum | Oct. 27, 1936 |
| 2,386,284 | Wynn | Oct. 9, 1945 |